United States Patent [19]

Collier et al.

[11] Patent Number: 5,272,933
[45] Date of Patent: Dec. 28, 1993

[54] STEERING GEAR FOR MOTOR VEHICLES

[75] Inventors: Gregory P. Collier, Saginaw; Michael P. Anspaugh; Terry E. Burkhard, both of Bay City, all of Mich.

[73] Assignee: General Motors Corporation, Detroit, Mich.

[21] Appl. No.: 952,375

[22] Filed: Sep. 28, 1992

[51] Int. Cl.$^5$ .................. B62D 3/12; B62D 5/22
[52] U.S. Cl. ........................ 74/498; 74/422;
 91/375 A; 180/148; 188/271; 188/381;
 267/208; 267/215
[58] Field of Search .............. 74/422, 498, 388 PS;
 91/375 A; 180/148; 188/83, 271, 381; 267/208,
 215

[56]  References Cited
U.S. PATENT DOCUMENTS

| | | | |
|---|---|---|---|
| 3,745,850 | 7/1973 | Bayle | 74/422 |
| 3,762,240 | 10/1973 | Adams | 74/498 |
| 3,844,182 | 10/1974 | Bradshaw et al. | 74/498 |
| 4,352,304 | 10/1982 | Warner | 74/498 |
| 4,501,191 | 2/1985 | Webber et al. | 91/375 A |
| 4,788,877 | 12/1988 | Robinson et al. | 91/375 A |
| 4,815,329 | 3/1989 | Ansgar et al. | 74/422 |

Primary Examiner—Allan D. Herrmann
Attorney, Agent, or Firm—Saul Schwartz

[57]  ABSTRACT

A motor vehicle rack and pinion steering gear having torsional damping by friction between an annular plastic damper ring on a housing of the steering gear and a journal surface on a pinion shaft of the steering gear. The damper ring has an outer wall press fitted in a pinion shaft bore of the housing to nonrotatably mount the ring on the housing and a plurality of flexible inner fingers resiliently bearing against the journal surface. An annular metal spring is disposed on the damper ring and includes a plurality of integral legs bearing against the flexible inner fingers of the damper ring to press the fingers against the journal surface.

4 Claims, 2 Drawing Sheets

STEERING GEAR FOR MOTOR VEHICLES

FIELD OF THE INVENTION

This invention relates to rack and pinion steering gears for motor vehicles.

BACKGROUND OF THE INVENTION

In motor vehicles with rack and pinion steering gears, it is desirable to minimize transmission of road induced torsional vibrations through the steering gear to the steering wheel gripped by the driver of the vehicle. U.S. Pat. No. 4,352,304, issued Oct. 5, 1982 and assigned to the assignee of this invention, describes a manual rack and pinion steering gear for motor vehicles having viscous torsional damping by fluid sheared between a plurality of concentric cylindrical walls connected alternately to a pinion or input shaft of the steering gear and to a housing of the steering gear. U.S. Pat. No. 4,815,329 describes a manual rack and pinion steering gear for motor vehicles having torsional damping by friction induced between a pair annular discs connected, respectively, to a pinion or input shaft of the steering gear and to a housing of the steering gear. A rack and pinion steering gear according to this invention incorporates novel structure for effecting torsional damping by friction.

SUMMARY OF THE INVENTION

This invention is a new and improved motor vehicle rack and pinion steering gear including a stationary housing having a cylindrical pinion shaft bore, a steering rack on the housing, a pinion shaft on the housing having a pinion meshing with rack teeth on the steering rack and a journal surface concentric with and spaced inward from the pinion shaft bore, an annular plastic damping ring nonrotatably press fitted in the pinion shaft bore with a plurality of flexible inner fingers slidably engaging the journal surface of the pinion shaft, and an annular metal spring on the damping ring having a plurality of integral legs pressing the flexible inner fingers of the damping ring against the journal surface to create friction between the inner fingers and the pinion shaft for damping torsional vibrations of the pinion shaft. In a fluid power assisted embodiment of the rack and pinion steering gear according to this invention, the journal surface, the damping ring, and the metal spring are located on the input or steering wheel side of a rotary control valve of the steering gear for optimum torsional damping performance.

DESCRIPTION OF A PREFERRED EMBODIMENT

Figure 1:
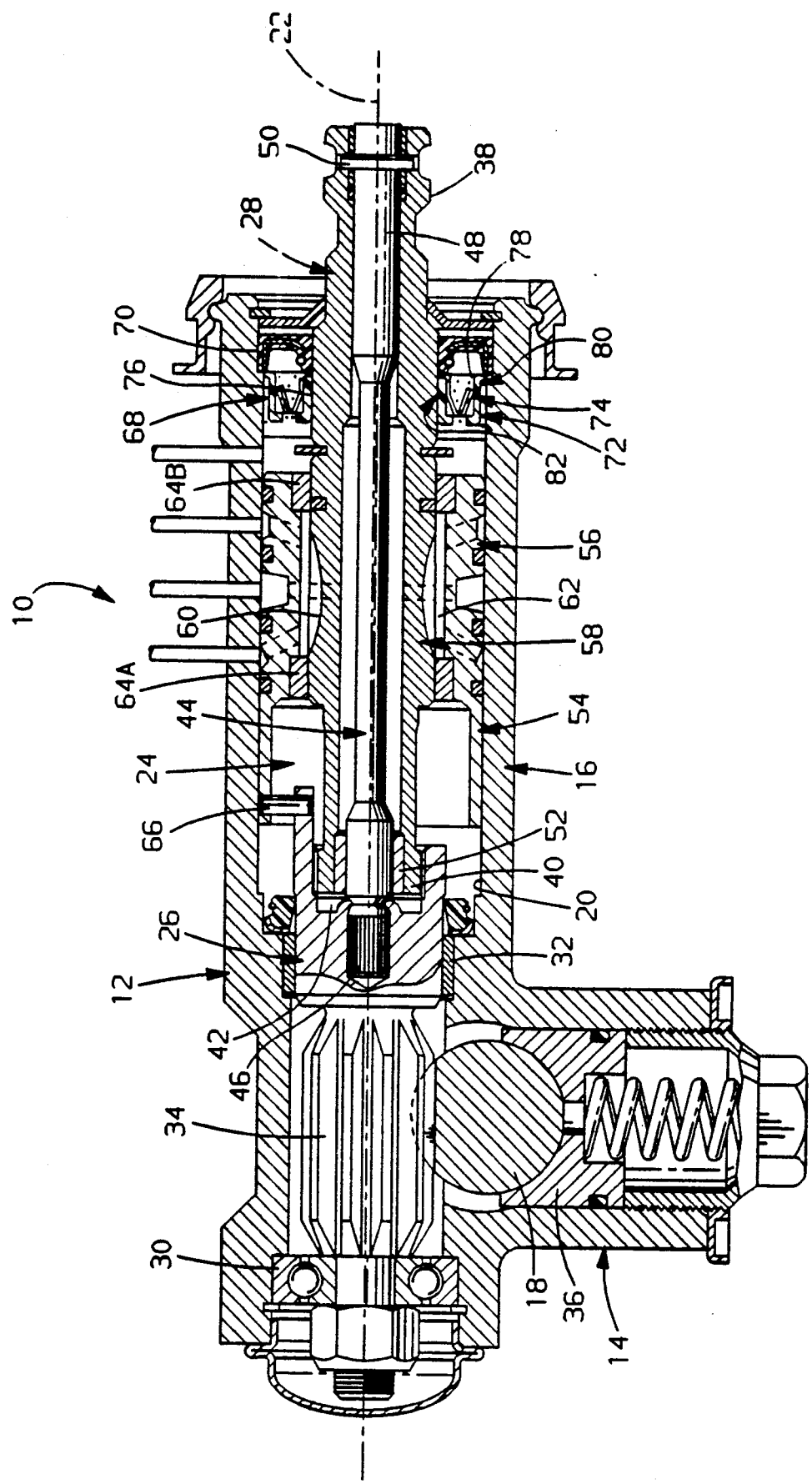
FIG. 1 is a partially broken-away sectional view of a fluid power assisted rack and pinion steering gear according to this invention taken generally along a pinion shaft axis of the steering gear.

Referring to FIG. 1, a fluid power assisted rack and pinion steering gear 10 according to this invention includes a housing 12 adapted for rigid attachment to a motor vehicle. The housing 12 includes a rack support 14 and a tubular valve housing 16. A steering rack 18 is mounted on the rack support 14 for bodily shiftable movement in the length direction of the steering rack. Opposite ends, not shown, of the steering rack are connected to steered wheels of the vehicle. In conventional fashion, bodily shiftable movement of the steering rack in its length direction is accompanied by pivotal movement of the steered wheels about their respective steering axes.

The inner wall of the valve housing 16 defines a cylindrical pinion shaft bore 20 of the steering gear housing aligned on a pinion shaft axis 22 of the latter. The valve housing 16 may be integral with the rack support, as shown, or may be a separate element rigidly attached to the rack support as described in U.S. Pat. No. 4,788,877, issued Dec. 6, 1988 and assigned to the assignee of this invention.

A pinion shaft 24 in the pinion shaft bore 20 includes a pinion head 26 and a tubular input or spool shaft 28. The pinion head 26 is mounted on the rack support 14 for rotation about the pinion shaft axis 22 by a ball bearing 30 and by a sleeve bearing 32. A pinion gear 34 on the pinion head between the bearings 30,32 meshes with rack teeth, not shown, on the steering rack 18 in the usual fashion. A bearing block 36 on the rack support is aligned with the pinion gear and is spring biased against the steering rack.

The spool shaft 28 is aligned on the pinion shaft axis 22 and includes an outboard end 38 adapted for connection to a manual steering wheel, not shown, of the motor vehicle for rotation as a unit with the steering wheel. The spool shaft further includes an inboard end 40 disposed within a cavity 42 in the pinion head. The spool shaft is rotatable relative to the pinion head through an angle limited by engagement of lugs, not shown, on the pinion head and the inboard end 40 of the spool shaft.

A torsion bar 44 of the pinion shaft is disposed inside the tubular spool shaft 28. The torsion bar 44 has an inboard end 46 press fitted in a bore in the pinion head and an outboard end 48 rigidly attached to the outboard end 38 of the spool shaft by a pin 50. A sleeve bearing 52 supports the spool shaft on the torsion bar for rotation about the pinion shaft axis 22 relative to the pinion head.

A rotary control valve 54 is disposed in the valve housing between the pinion shaft bore 20 and the spool shaft 28 and includes a valve sleeve 56 and a valve spool 58 integral with the spool shaft. The valve spool includes a plurality of slots 60 in the spool shaft within the confines of the valve sleeve. The valve sleeve 56 includes a plurality of grooves 62 facing the slots 60 between a pair of seal rings 64a-b on the sleeve. The sleeve 56 is connected to the pinion head 26 by a pin 66 for rotation as unit with the pinion head about the pinion shaft axis 22.

The slots and grooves cooperate in conventional fashion to port pressurized fluid to one side or the other of a steering assist fluid motor, not shown, in conventional fashion. The torsion bar 44 centers the valve spool 58 relative to the valve sleeve 56. Reference may be made to U.S. Pat. No. 3,022,772, issued Feb. 27, 1962 and assigned to the assignee of this invention, for a full description of the structure and operation of a representative rotary control valve.

Figure 2:
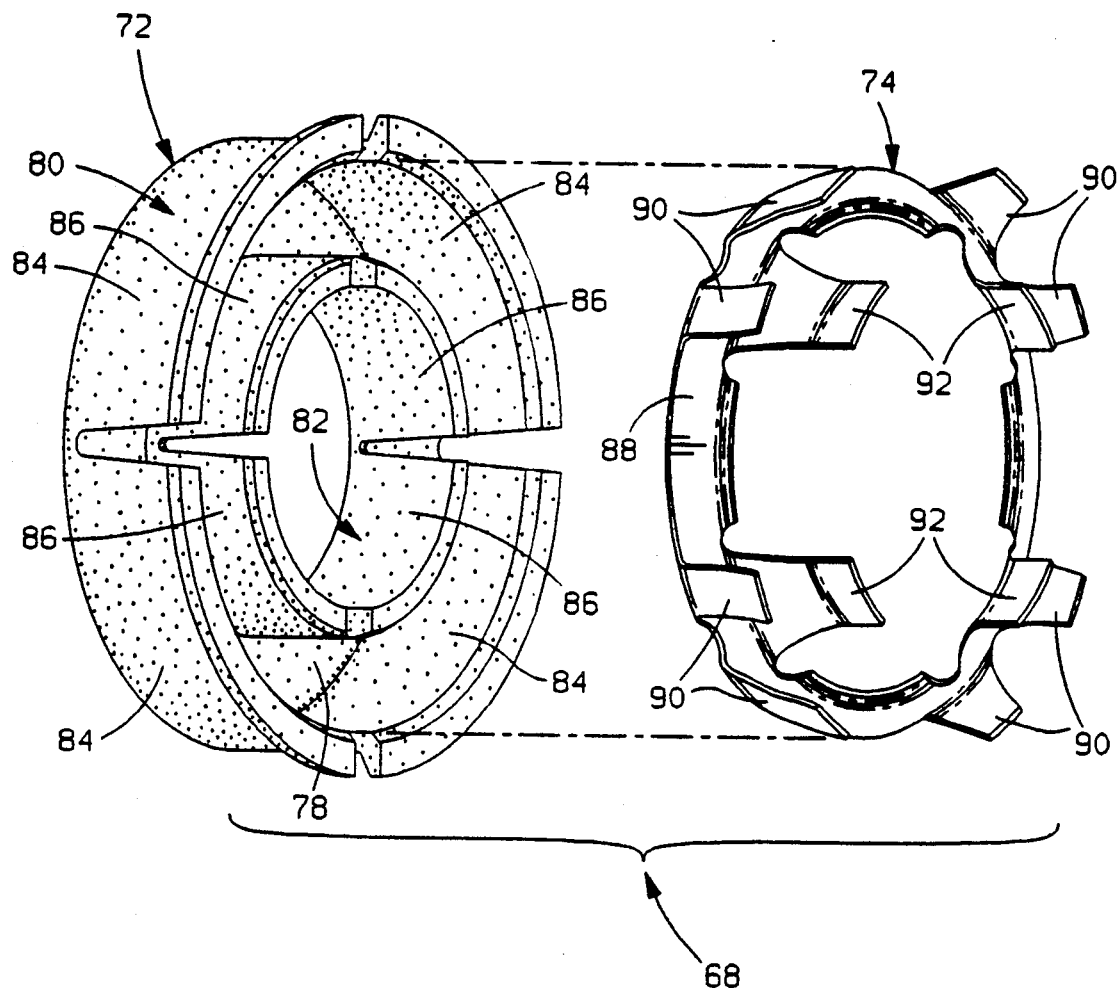
FIG. 2 is an exploded perspective view of a portion of FIG. 1.

Referring to FIGS. 1-2, a friction damper 68 for damping torsional vibrations of the spool shaft 28 is disposed in the valve housing between the rotary valve 54 and a seal 70 closing the outboard end of the valve housing 16. The friction damper 68 includes an annular plastic damping ring 72, an annular metal spring 74, and an uninterrupted cylindrical journal surface 76 of the spool shaft 28 radially inboard of the damping ring 72. The damping ring 72 includes an annular web 78, a generally cylindrical outer wall 80 integral with the and connected to the web 78 at the outside diameter thereof, and a generally cylindrical inner wall 82 integral with and connected to the web 78 at the inside diameter thereof.

The outer wall 80 flares out slightly from the web 78 and may be segmented to define a plurality of flexible outer fingers 84 integral with the web 78. The outer wall 80 is slightly larger than the pinion shaft bore 20 so that when the damping ring is press fitted into the pinion shaft bore the damping ring is frictionally restrained against rotation about the pinion shaft axis 22 relative to the valve housing 16. Other means for preventing rotation of the damping ring relative to the valve housing may be used.

The inner wall 82 flares in slightly from the web 78 and is segmented to define a plurality of flexible inner fingers 86 integral with the web 78. The inner wall 82 is slightly smaller than the journal surface 76 of the spool shaft 28 so that when the damping ring is press fitted into the pinion shaft bore around the spool shaft, the flexible inner fingers 86 resiliently bear against the journal surface. The journal surface 76 is slidable relative to the flexible inner fingers when the spool shaft rotates relative to the valve housing.

The metal spring 74 mounts on the damping ring 72 between the inner and the outer walls 82,80 and includes an annular web 88, a plurality of integral outer legs 90, and a plurality of integral inner legs 92 aligned with the centers of respective ones of the flexible inner fingers 86 of the damping ring. The inner and outer legs 92,90 flare inward and outward, respectively, from the inner and outer diameters of the web 88 and resiliently flex in opposite directions when the spring is mounted on the damping ring and the damping ring is pressed in the pinion shaft bore around the spool shaft.

Flexure of the inner legs presses the flexible inner fingers 86 against the journal surface 76 to increase frictional resistance to rotation of the spool shaft relative to the damping ring. Flexure of the outer legs 90 presses the outer wall 80 more tightly against the pinion shaft bore 20 to enhance anchorage of the damping ring on the valve housing.

In operation, the inner legs 92 exert a relatively constant inward radial force on the flexible inner fingers 86 to create a relatively constant frictional drag or damping force between the damping ring and the spool shaft to damp torsional vibrations. The damping force created by the spring 74 stays substantially constant over the life of the steering gear 10 because it is unaffected by any permanent set which the flexible plastic inner fingers 86 my take. The damping force may be varied for different steering gear applications by varying the spring rate of the inner and outer legs 92,90 of the metal spring 74.

It is an important features of this invention that the friction damper 68 is located on the input side of the rotary valve 54, i.e. between the rotary valve 54 and the end of the pinion shaft 24 defined by the outboard end 38 of the spool shaft 28. It has been observed that inducing friction on the pinion shaft on the input side of the rotary valve more effectively isolates the steering wheel from high frequency road inputs than does inducing friction on the pinion shaft on the opposite or output side of the rotary valve.

The embodiments of the invention in which an exclusive property or privilege is claimed are defined as follows:

1. A rack and pinion steering gear comprising:
   a housing having a cylindrical pinion shaft bore aligned on a pinion shaft axis of said housing,
   a pinion shaft means having an outboard end adapted for connection to a manual steering wheel and a pinion gear adjacent an inboard end of said pinion shaft means,
   means mounting said pinion shaft means on said housing in said pinion shaft bore for rotation about said pinion shaft axis,
   means on said pinion shaft means defining a cylindrical journal surface spaced from and concentric with said pinion shaft bore,
   an annular plastic damper ring disposed in said pinion shaft bore having an annular web in a plane perpendicular to said pinion shaft axis and an outer wall integral with said web facing said pinion shaft bore and a plurality of flexible inner fingers integral with said web bearing against said journal surface of said pinion shaft means,
   means operative to nonrotatably connect said outer wall of said damper ring to said pinion shaft bore, and
   a spring means disposed on said plastic damper ring including a plurality of inner legs each bearing against respective ones of said flexible inner fingers of said damper ring.

2. The rack and pinion steering gear recited in claim 1 wherein said pinion shaft means includes:
   a pinon head having said pinion gear formed thereon,
   means mounting said pinion head on said housing for rotation about said pinion shaft axis,
   a spool shaft having an outboard end adapted for connection to said manual steering wheel and an inboard end and said journal surface formed thereon between said inboard and said outboard ends thereof,
   means mounting said spool shaft on said housing in said pinion shaft bore for rotation about said pinion shaft axis relative to said pinion head,
   means defining a valve spool on said spool shaft, and
   a spring means between said pinion head and said spool shaft defining a centered position of said spool shaft relative to said pinion head.

3. The rack and pinion steering gear recited in claim 2 wherein:
   said journal surface is located on said spool shaft between said valve spool and said outboard end of said spool shaft.

4. The rack and pinion steering gear recited in claim 3 wherein said spring means on said plastic damper ring includes:
   an annular metal web abutting said web of said damper ring,
   a plurality of metal outer legs integral with said metal web resiliently bearing against said outer wall of said damper ring, and
   a plurality of metal inner legs integral with said metal web resiliently bearing against respective ones of said flexible inner fingers of said damper ring thereby to press said inner fingers against said journal surface.

* * * * *